United States Patent [19]

Essert

[11] Patent Number: 5,440,657
[45] Date of Patent: Aug. 8, 1995

[54] RE-ENTERABLE SPLICER FOR RIBBON FIBER

[75] Inventor: Robert Essert, Wheaton, Ill.

[73] Assignee: The Whitaker Corporation, Wilmington, Del.

[21] Appl. No.: 249,536

[22] Filed: May 26, 1994

[51] Int. Cl.⁶ .................................................. G02B 6/38
[52] U.S. Cl. ........................................ 385/71; 385/59; 385/114; 385/134
[58] Field of Search ................ 385/59, 71, 95–98, 385/114, 134, 136, 137

[56] References Cited

U.S. PATENT DOCUMENTS

| 4,046,454 | 9/1977  | Pugh, III       | 350/96 C |
| 4,146,301 | 3/1979  | Cherin et al.   | 385/59 X |
| 4,818,058 | 4/1989  | Bonanni         | 385/71   |
| 5,121,456 | 6/1992  | Essert et al.   | 385/70   |
| 5,151,964 | 9/1992  | Carpenter et al.| 385/98   |
| 5,155,781 | 10/1992 | Doss et al.     | 385/71   |
| 5,155,787 | 10/1992 | Carpenter et al.| 385/98   |
| 5,309,538 | 5/1994  | Larson          | 385/98   |
| 5,339,377 | 8/1994  | Takahashi       | 385/98   |

FOREIGN PATENT DOCUMENTS 1-227106  9/1989  Japan ..................... 385/59

Primary Examiner—John D. Lee

[57] ABSTRACT

Apparatus for splicing a plurality of optical fibers of ribbonized fiber optic cable comprises: an elongate base has a splicing area and guides for directing optical fibers of a ribbonized fiber optic cable from either end of the elongate base into alignment with the splicing area. A first splicing element defining a splicing surface having a plurality of elongate parallel channels for receiving and aligning respective optical fibers is disposed in the splicing area. A second splicing element configured for overlying the first splicing element and maintaining optical fibers in the channels is mounted to the base.

13 Claims, 4 Drawing Sheets

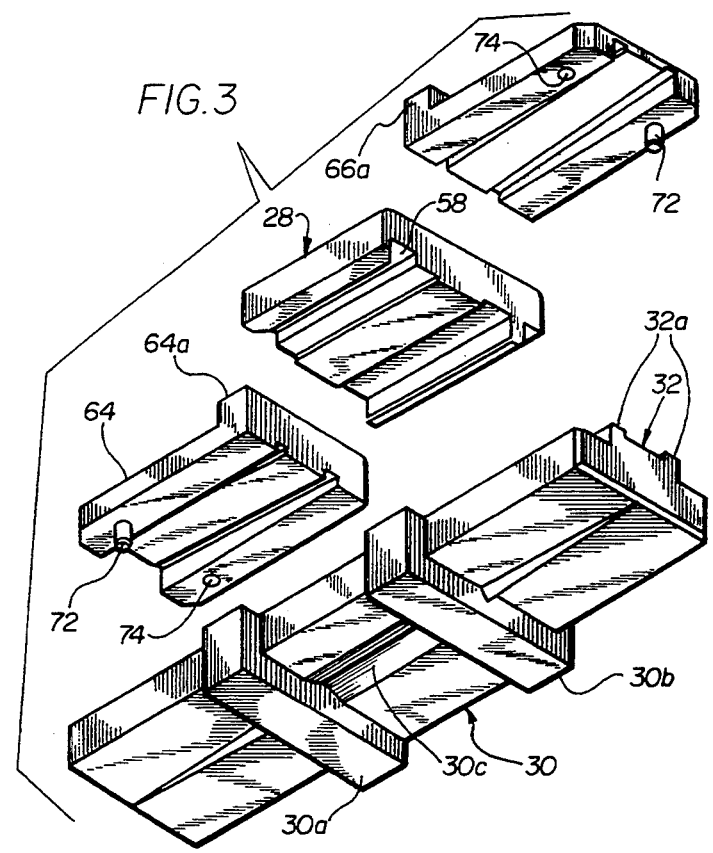
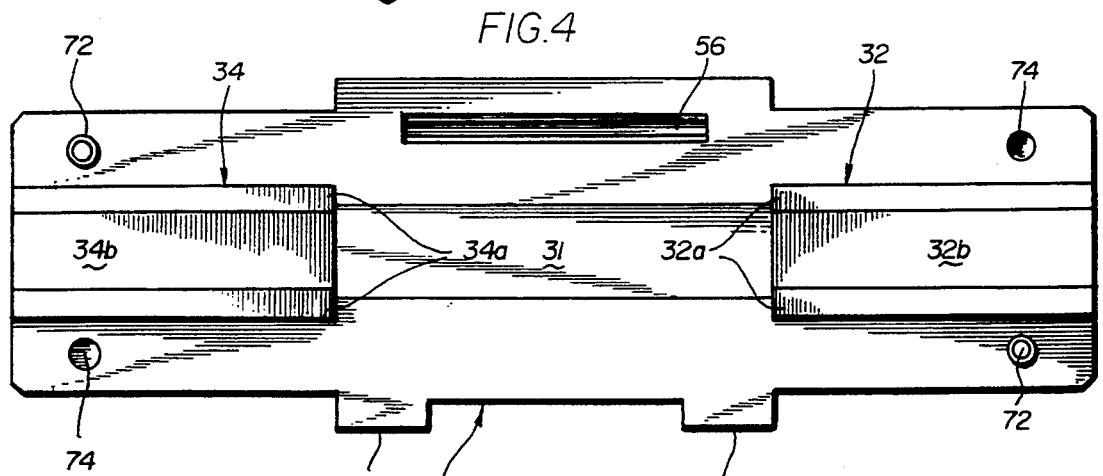
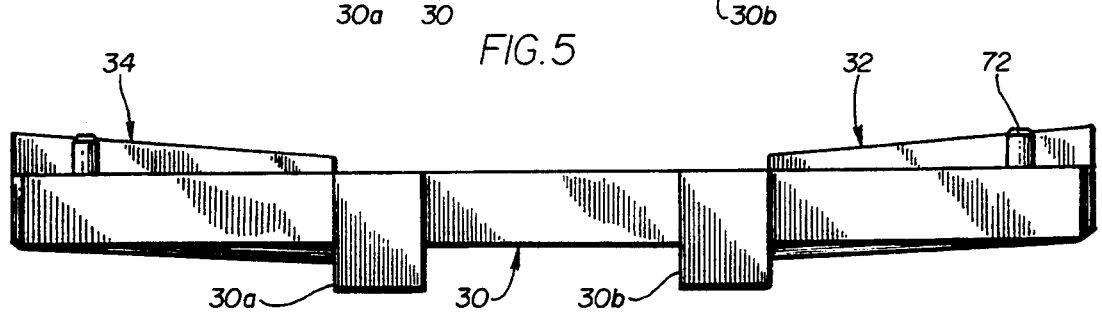

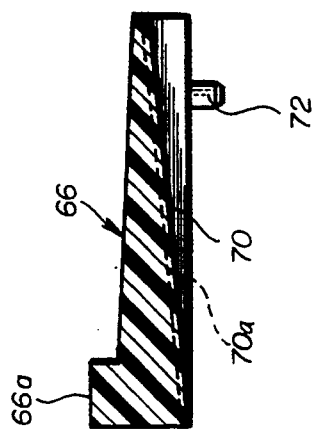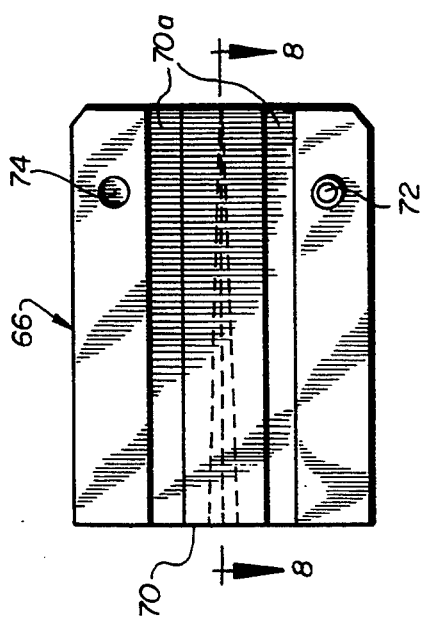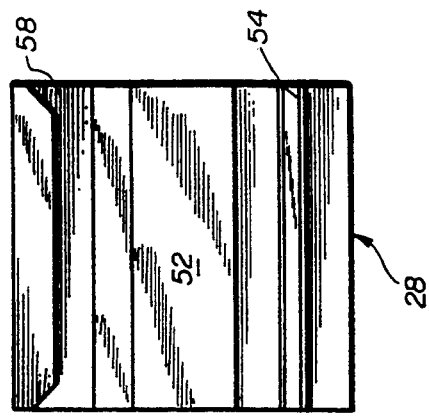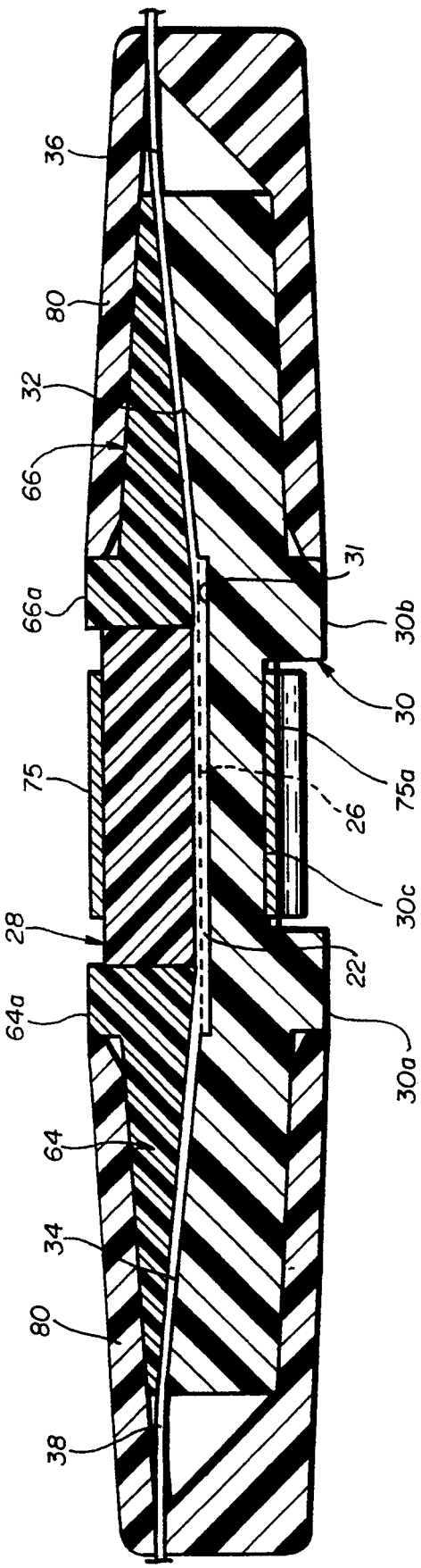

RE-ENTERABLE SPLICER FOR RIBBON FIBER

BACKGROUND OF THE INVENTION

This present invention is directed to the fiber optic splicing arts and more particularly to a novel and improved re-enterable splicer for a ribbon fiber or ribbonized fiber optic cable.

One particularly useful and successful re-enterable splicer for optical fibers is shown and described in U.S. Pat. No. 5,121,456 which is commonly owned herewith. This splicer includes a metallic splice element which is assembled from two essentially identical halves and includes a longitudinal channel or groove for receiving an end part of each of two optical fibers to be spliced. The splice element is held within a pair of polymer body halves which function as spring clamps for clamping the splice element halves together about fibers to be held in the groove or channel therein. A passageway is provided for a tool that is to operate the splicer so that a fiber can be inserted into the splicer or removed therefrom. This splicer accommodates a single splice; however, a number of additional problems arise in the case of splicing the multiple fibers of a ribbon fiber or ribbonized optical fiber cable.

Such a ribbonized fiber optic cable generally comprises a plurality of optical fibers (typically twelve in number), each of which is provided with a surrounding buffer and a generally flat profile outer jacket, which is often color-coded. The generally flat profile jackets are coupled together by suitable adhesive means to form a generally flat ribbon-like cable containing a plurality of optical fibers, which are arranged in a parallel and spaced condition.

One problem which arises in splicing together the respective ends of two such ribbonized fiber optic cables is that of properly aligning the individual ends of all twelve fibers of each cable with the corresponding twelve fibers of the other cable. The metallic splice element of the above-referenced U.S. Patent contains only a single channel or groove for accommodating fibers. Moreover, the fibers of the typical ribbonized cable are very closely spaced, such that it is difficult to simultaneously align and retain these multiple fibers with those of another similar ribbonized cable within a re-enterable splicer.

Another problem which arises in the case of the ribbonized fiber optic cable is that of guiding respective cables into alignment with a splicing element such that all twelve of the optical fibers therein align with and enter the splicing element simultaneously, as well as being aligned with all of the fibers of a similar ribbonized cable entering from an opposite end of the splice.

Yet a further problem is that of applying sufficient force to the splicer to maintain all of the optical fibers of two such ribbonized cables in place and in optical alignment within the splicer following their initial entry and alignment. It should be noted in this regard that in a splicer employing two splice halves for, in effect, "sandwiching" together the fibers, there will be forty-eight (48) points of contact when splicing a pair of twelve fiber ribbonized cables. That is, each of the twenty-four fibers of the two cables will have one point of contact with each half of the splicer. It can be calculated that a substantial amount of force is necessary to reliably retain the fibers within the splicer with this many points of contact. It is difficult to make a re-enterable splicer in such a manner as to apply the necessary amount of force for maintaining all of the fibers of two such ribbonized cables in a spliced condition therein.

OBJECTS AND SUMMARY OF THE INVENTION

Accordingly, it is a general object of this invention to provide a novel and improved splicer for ribbonized optical fiber optic cable.

Another object is to provide a novel re-enterable splicer in accordance with the foregoing object.

Yet another object is to provide a splicer in accordance with the general object which is relatively simple to use and yet highly reliable in operation.

A related object is to provide a splicer in accordance with the general object which is relatively simple to manufacture.

Briefly, and in accordance with the foregoing object, an apparatus for splicing a plurality of optical fibers of ribbonized fiber optic cable comprises an elongate base having a splicing area and guide means for guiding optical fibers of a ribbonized fiber optic cable from either end of said elongate base member into alignment with said splicing area; first splicing means disposed in said splicing area defining a splicing surface having a plurality of elongate parallel channels for receiving and aligning respective optical fibers, and second splicing means coupled to said elongate base for overlying said first splicing means and maintaining optical fibers in said channels.

BRIEF DESCRIPTION OF THE DRAWINGS

The features of the present invention which are believed to be novel are set forth with particularity in the appended claims. The organization and manner of operation of the invention, together with further objects and advantages thereof may best be understood by reference to the following description, taken in connection with the accompanying drawings in which like reference numerals identify like elements, and in which:

FIG. 3 is an exploded perspective view of a portion of FIG. 2 taken from a different perspective:

FIG. 4 is a plan view of a base portion of the splicer of the invention;

FIG. 5 is a side elevation of the base portion of FIG. 4;

FIG. 6 is a plan view, shown from the inside, of a splicer cover portion of the splicer of the invention;

FIG. 7 is a plan view of an end cover portion of the splicer of the invention;

FIG. 8 is a sectional view taken generally along the line 8—8 of FIG. 7;

FIG. 9 is a longitudinal sectional view through the splicer of FIG. 1;

DETAILED DESCRIPTION OF THE ILLUSTRATED EMBODIMENT

Figure 1:
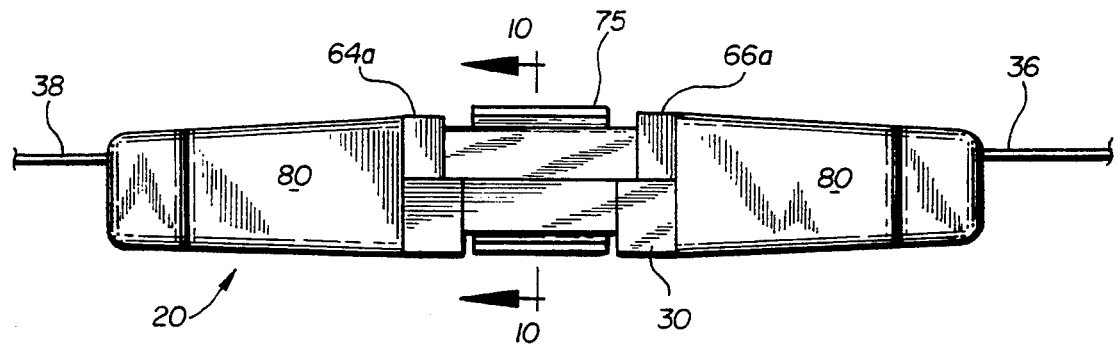
FIG. 1 is a side elevation of a fully assembled splicer in accordance with the invention together with a pair of ribbon fibers being spliced therein.
Figure 2:
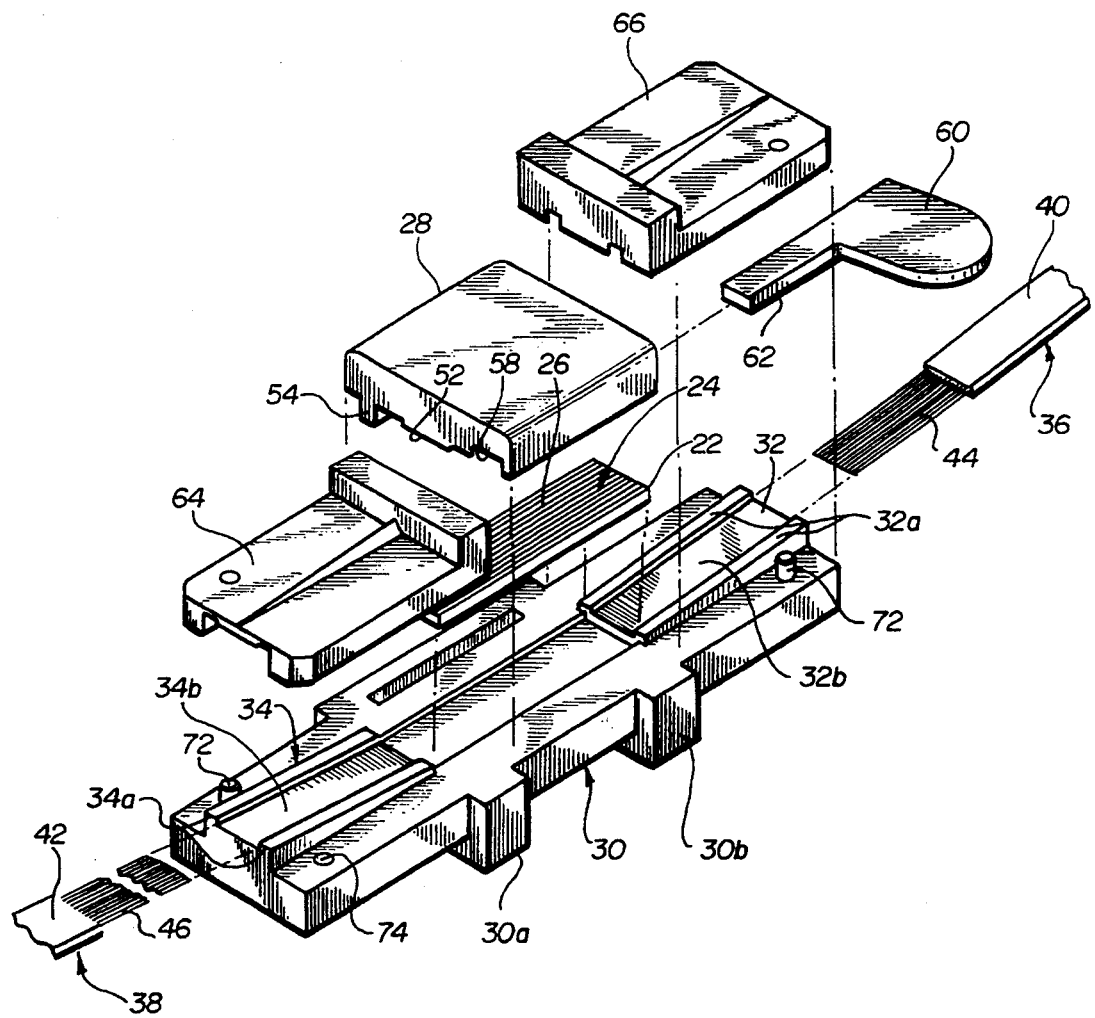
FIG. 2 is an exploded perspective view of a portion of the splicer of FIG. 1.

Referring now to the drawings, and initially to FIGS. 1 and 2, there is shown apparatus for splicing a plurality of optical fibers of a ribbonized fiber optic cable, which apparatus is designated generally by the reference numeral 20. The splicing apparatus or splicer 20 has a first splice element or splicing means 22 which defines a splicing surface 24 having a plurality of elongate parallel channels 26 for receiving and aligning respective optical fibers. A second splice element or splicing means 28 is configured for overlying the first splicing means 22 for maintaining optical fibers in the respective channels 26. An elongate base member 30 has a splice mounting area or recess 31 which mounts the first splicing means 22. The second splicing means 28 is mounted to the base 31 in an alignment for maintaining optical fibers in the respective channels 26 of the first splicing means or element 22.

Guide means, which in the illustrated embodiment take the form of a pair of ramps 32, 34 formed in the base member 30, are provided for guiding optical fibers of a ribbonized fiber optic cable from either end of the base member into alignment with the channels 26 of the first splicing means 22. In this regard, end portions of a pair of ribbonized fiber optic cables 36, 38 are illustrated in FIG. 2.

As mentioned hereinabove each of these cables 36, 38 comprises a plurality of optical fibers which are surrounded by respective buffer portions and generally flat profile jackets. These jackets are coupled together in a side-by-side arrangement to form the generally flat ribbon-like cable as illustrated with respect to cables 36 and 38 in FIG. 2. The respective jackets 40, 42 Of the respective ribbonized cables 36 and 38 have been stripped back to reveal the respective optical fibers 44, 46 thereof which are to be guided into alignment with respective channels 26 to achieve splicing of respective individual ones of these optical fibers 44 and 46. Typically, such ribbonized cables contain a total of twelve such optical fibers. Advantageously, the novel splice apparatus or splicer 20 of the invention is adapted to receive and properly align the respective end parts of optical fibers 44 and 46 for simultaneously splicing all of the optical fibers of the two cables 36 and 38.

Figure 11:
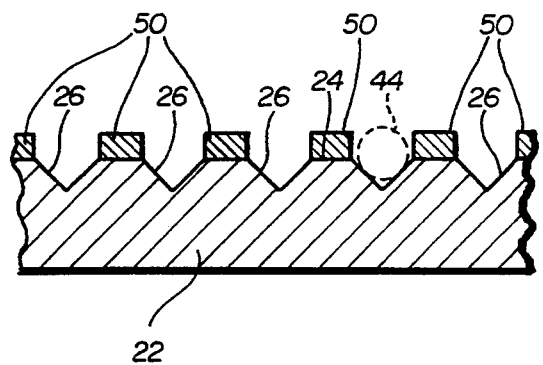
FIG. 11 is an enlarged partial view of a portion of FIG. 10.

Referring now also to FIG. 11, in the illustrated embodiment, the first splicing means or splice element 22 comprises a relatively elongated, flat member having the channels 26 formed longitudinally thereacross. Preferably, this elongated flat member is formed from a wafer of epitaxial silicon material which has a plurality of parallel grooves 26 etched therein to form the channels 26. FIG. 11 illustrates a partial, greatly enlarged cross-sectional view of the splice element 22 showing the flat upper surface 24 and channels 26 etched therein.

FIG. 11 further partially illustrates an etching process in which a plurality of elongate parallel spaced stripes or bars 50 of a "resist" are overlaid upon the surface 24. A suitable etching material or chemical is placed into contact with the surface 24, whereupon generally V-shaped grooves or channels 26 are formed intermediate the stripes or bars 50 of the resist material. The resist material 50 is removed after the etching process is complete. These V-shaped grooves 26 are of a suitable size for receiving the generally cylindrical shaped fibers 44 therein as is illustrated for one fiber 44 in phantom line in FIG. 11.

The epitaxial structure of the silicon crystal from which the wafer for the splice element is sliced and the manner in which the wafer is sliced assure that the etching process will produce such V-shaped grooves. Generally speaking "epitaxial" refers to a crystalline structure in which each layer has the same structure as an underlying layer. The term is also used to refer to a process of growing a crystal layer upon another crystal so that the new crystal has the same crystalline structure as the one on which it is grown.

Figure 10:
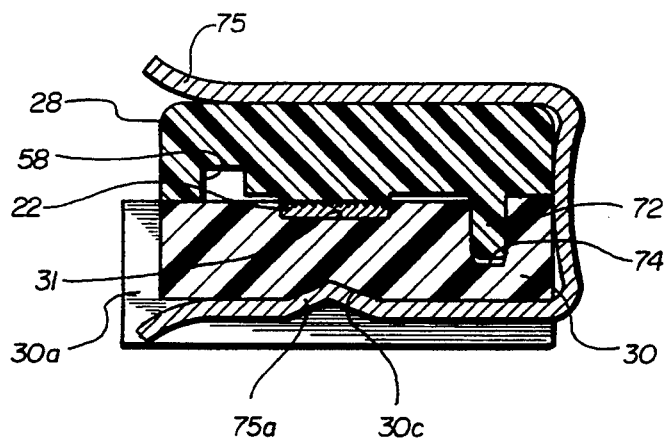
FIG. 10 is a sectional view taken generally along the line 10—10 of FIG. 1.

Referring now also to FIGS. 6, 9 and 10, the second splicing element or means 28 is preferably formed of a plastics material, such as a polymer. This element 28 includes a substantially flat, elongate surface 52 which is located and configured for overlying the channels 28 of the splicing element 22 for maintaining optical fibers in these channels. The splicing element 28 also includes a coupling member or means, which in the illustrated embodiment takes the form of an elongate projecting ridge member 54 for joining the element 28 to the base 30 along a line which is parallel to and to one side of the channels 26. In this regard, the base 30 includes a complementary elongate trough or depression 56 (see also FIG. 4) for receiving the projecting ridge 54. These complementary elements 54, 56 may be joined by suitable means such as sonic welding or by the use of suitable adhesives. Thus, the splice element 28 is rigidly joined to the base 30 along one side of the channels 26.

In order to introduce or remove optical fibers such as the fibers 44 and 46 between the splice elements 22 and 28, means are provided for lifting at least a portion of the splicing element 28 slightly relative to the base 30. To accomplish this partial lifting, in the illustrated embodiment, an elongate opening 58 is formed longitudinally of the second splicing element 28 and located generally parallel to the channels 26, and to a side of the channels 26 opposite to the side at which the joining members 54, 56 are located. This elongate opening 58 is configured for receiving a cooperating tool or key-like element 60 for partially forcing the splice element 28 away from the base 30 along the opening 58.

In the illustrated embodiment, the opening 58 is generally rectangular in cross section and the complementary tool or key 60 presents an elongate shank 62 which is of similar rectangular cross section, however, preferably with rounded edges. Thus, it will be appreciated that the tool or key 60 may be freely inserted relative to the opening 58, whereupon 90° of rotation of the shank 62 will cause a wedging apart of the splice element 28 and base 30. Preferably, the extent of movement of the splice element 28 is just sufficient to permit either insertion or removal of fibers from the side at which the key or tool 60 is introduced into the opening 58, without disturbing or permitting removal of, optical fibers previously inserted from the opposite side. Thus, the key or tool 60 is inserted into and operated from either end of the opening 58 to achieve removal or introduction of fibers relative to a corresponding end of the channels 26.

Referring now also to FIGS. 4, 5 and 9, it will be seen that the ramps or ramp means 32, 34 are formed on the base 30 extending generally oppositely outwardly from the opposite ends of the splicing element 22. These ramps extend at an upward angle relative to the flat surface 24 of the splicing element 22. Preferably, this angle is between about 3° and 8°, which angle has been found to facilitate the desired sliding of the optical fibers 44, 46 into the channels 26. However, other specific angles could be selected for achieving equivalent operation without departing form the invention. An angle of 4.6° was selected in the illustrated embodiment. If the angle is too steep, the fibers 44, 46 will tend to forcibly abut, rather than slide into the grooves 26. If the angle is too shallow, the fibers may fail to accurately locate the grooves. The base 30 may be molded from a suitable plastics material, and preferably from the same polymer as that used to form the splicing element 28.

Referring also to FIGS. 7 and 8, the splicer 20 further includes a pair of substantially identical opposite end covers or cover means 64, 66. These end covers are coupled to the base 30 and are configured for enclosing the ramps 32 and 34. The covers 64 and 66 are substantially identical, whereby only the cover 66 one is illustrated in FIGS. 7 and 8. It will be seen that the covers 64, 66 are provided with ramped surfaces 68, 70 generally complementary with the respective ramps 32 and 34 for overlying the same, parallel thereto and somewhat spaced thereabove so as to releasably clamp and retain the jackets 40, 42 therebetween. This spacing is such as to allow free sliding entry of respective ribbonized fiber optic cables 36 and 38 through the assembled covers and base, continuing downwardly along the ramps 32 and 34 so as to guide respective optical fibers 44 and 46 into to the respective channels 26 of the splice element 22. In this regard, the respective ramps 32 and 34 have respective raised ridges or guide walls 32a, 34a to either side thereof to define channels 32b and 34b of similar width to the jackets 40, 42 of the ribbonized fiber optic cables 36 and 38. The respective covers 64 and 66 have corresponding complementary recesses or grooves 68a, 70a to locate these ridges or walls 32a, 32b to align the ramp surfaces of the covers with those of the base.

The respective end covers 64, 66 and the base 30 are also provided with complementary sets of projecting bosses 72 and receiving recesses or bores 74 for joining and aligning the respective end covers 64 and 66 with the base 30. Preferably, the respective bores and bosses are releasably joined by a snap fit or press fit, such that the covers may be removed to remove or replace the associated ribbonized fiber cables 36, 38.

Referring also to FIGS. 9 and 10, a resilient spring-like clip member 75, preferably of a metallic material such as a spring steel is also provided for engaging the base 30 and the splicing element 28 therebetween. This engagement is such as to press the splicing element 28 and the splicing element 22 together so as to exert additional force (preferably on the order of 3 pounds) upon any fibers held in the channels 26 so as to maintain these fibers in their respective corresponding channels. The spring clip member 75 is positioned between two parallel and spaced projecting wall surfaces 30a, 30b of the base portion 30 which extend around the bottom and front sides thereof. In addition, a bottom surface of the base 30 has a generally V-shaped elongate depression or notch 30c for receiving and locating a corresponding indentation portion 75a of the spring clip 75, as best viewed in FIG. 10.

In the illustrated embodiment, respective end caps or end cap means 80 are also provided. These end caps 80 are substantially identical and are preferably formed of a resilient rubber or rubber-like material. The end caps 80 are generally formed with tapered interiors to conform generally to external surfaces of the respective outer end portions of the base 30 and of the respective end cover members 64 and 66, as best viewed in FIG. 9.

Figure 12:
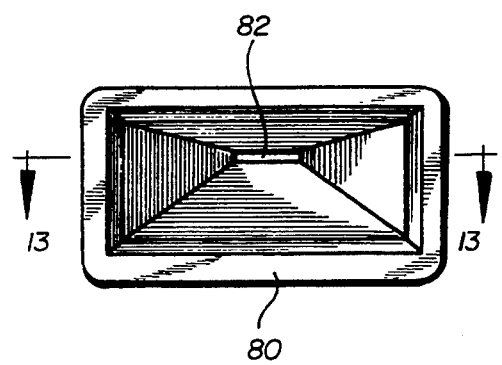
FIG. 12 is an end plan view of an end cap portion of the splicer of the invention.
Figure 13:
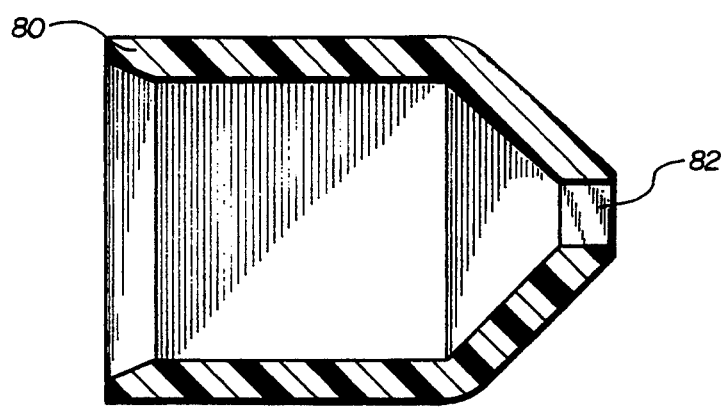
FIG. 13 is a sectional view taken generally along the line 13—13 of FIG. 12.

The covers 64, 66 may be provided with enlarged ribs 64a, 66a at their inner ends, which have outer surfaces aligned with those of the walls 30a, 30b of the base, to abut the end caps 80. Further details of the end caps are shown in FIGS. 12 and 13. The end caps have respective through openings 82 which are of complementary cross-sectional shape for slidably receiving the jackets 40, 42 of ribbonized fiber optic cables 36, 38, freely slidable therethrough. Preferably, the end caps would be initially slidably affixed to the respective ribbon fibers, and then slid forward to enclose the respective end parts of the splice element 20 after the fibers have been inserted and spliced thereat. The outer edges of the walls 30a and 30b and of the ribs 64a, 66a also provide stops for defining the fully assembled positions of respective end caps 80.

Briefly, a splice between two ribbonized fiber optic cables 36, 38 may be effected by the apparatus of the invention by the following procedure. The exposed optical fibers 44, 46 are introduced into channels 26, one at a time, from either end of the splicer by inserting and turning the tool or key 60 at one end, and inserting one set of fibers, rotating and removing the key, and then repeating the process from the opposite end. The ribbon 36 (or 38) is slid down the open surface of the ramp 32b (or 34b) until the fibers 44 (or 46) contact the exposed outer end of the grooves 26. It will be noted that the length of the surface 52 is less than that of the surface 24, such that end portions of the grooves 26 are exposed at either end of the top or second splicing element 28, i.e., the end covers 64, 66 are not applied to the base 30 at this time.

When all the fibers 44 (or 46) have properly entered the channels 26, a uniform reflective pattern will be visually apparent and the fibers may be advanced to a point slightly past the longitudinal center of the grooves 26. If a non-uniform reflective pattern is observed, the ribbon is withdrawn enough to remove the fibers from contact with the grooves, shifted slightly and advanced again. This process may require several attempts, but each attempt takes only a few seconds. The first set of fibers is thusly positioned and advanced slightly past the one-half way mark longitudinally in the grooves 26. The second set of fibers is inserted from the other side following the same procedure until the first set of fibers moves slightly indicating that the fiber ends are abutting. The key 60 is then turned to "close" the splicer.

Thereupon the respective end covers 64 and 66 are applied to the base 30. If desired, an environmental sealant or gel may be applied immediately prior to applying end covers 64, 66. Either before or immediately following application of end covers 64, 66 the clamp 75 is applied to the base and upper splice element 28; however, this is preferably done before applying the end plates. Finally, the end caps 80 are slipped up from the projecting cables 36, 38 to either end of the splice assembly.

Preferably, a quantity of a gel material, selected for refractive properties similar to the optical fibers 44 and 46 is introduced into the grooves 26, upon initial assembly of the splice element or wafer 22a with the base and just prior to application of the second or overlying splice element 28. This gel material is primarily intended to imitate the refractive properties of the optical fibers and thereby to carry light across the splice between the respective ends of fibers 44 and 46. Also, this gel material serves a protective purpose, that is, to protect the glass fibers from the atmosphere in much the same way as the buffer portion, which was removed from the ends of the fibers 44 and 46 prior to entering the splice channels, as described hereinabove.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A re-enterable splicer apparatus for splicing a plurality of optical fibers comprising:
   an elongate base having spaced apart ends defining an axis of elongation;
   first splicing means defining a splicing surface having a plurality of elongate parallel channels for receiving and aligning respective optical fibers, said first splicing means being positioned on said elongate base generally intermediate said spaced apart ends;
   second splicing means configured for overlying said first splicing means and maintaining said respective optical fibers in said channels;
   means for retaining said second splicing means on said base;
   guide means for guiding optical fibers of a ribbonized fiber optic cable from opposite ends of said base member into alignment with said channels of said first splicing means for retention between said first and second splicing means;
   an elongate passage longitudinally extending through said second splicing means generally parallel to said axis and spaced apart from said first splicing means; and
   splice opening means insertable into either end of said elongate passage for partially displacing said second splicing means relative to said base by an amount sufficient to facilitate manipulation of optical fibers positioned on a corresponding guide means relative to said channels.

2. Apparatus according to claim 1 wherein said first splicing means comprises a relatively elongated, flat silicon chip having said elongate channels formed longitudinally thereacross.

3. Apparatus according to claim 2 wherein said elongated, flat silicon chip comprises a wafer of epitaxial silicon material having a plurality of parallel, longitudinally extending grooves which are generally V-shaped in cross-section etched therein and comprising said channels.

4. Apparatus according to claim 1 wherein said second splicing means includes a substantially flat surface configured for overlying the channels of said first splicing means for maintaining optical fibers in the channels; and said retaining means further including coupling means for joining said second splicing means to said base along a line parallel to and to one side of said channels of said first splicing means.

5. Apparatus according to claim 4 wherein said elongate passage and said coupling means are configured and located on opposite sides of said first splicing means such that operation of tool means entering said elongate passage from one end thereof displaces said second splicing means relative to said base only to the extent necessary to allow removal and replacement of optical fibers entering from a corresponding end of said channels and without disturbing optical fibers entering from an opposite end of said channels.

6. Apparatus according to claim 1 said retaining means further including a resilient spring-like clip member engaging said base and said second splicing means for pressing said second splicing means and said first splicing means together for exerting a predetermined force upon fibers in said channels.

7. Apparatus according to claim 1 wherein said guide means comprises ramp means formed on said base extending oppositely outwardly.

8. Apparatus according to claim 7 wherein said ramp means extend outwardly and are angled upwardly.

9. Apparatus according to claim 8 wherein said first splicing means has a substantially flat surface in which said channels are formed and wherein said ramp means extend upwardly and outwardly at an angle relative to said flat surface.

10. Apparatus according to claim 9 wherein said angle is substantially on the order of between 3° and 8°.

11. Apparatus according to claim 7 and further including end cover means coupled to said base and configured for enclosing said ramp means.

12. Apparatus according to claim 11 wherein said guide means further comprises complementary ramp surfaces on said end cover means located and configured for overlying said ramp means parallel and spaced apart therefrom.

13. Apparatus according to claim 11 and further including end cap means for surroundingly engaging end portions of said end cover means and said base and having a through opening for receiving a ribbonized fiber optic cable therethrough.

* * * * *